Figure 1:
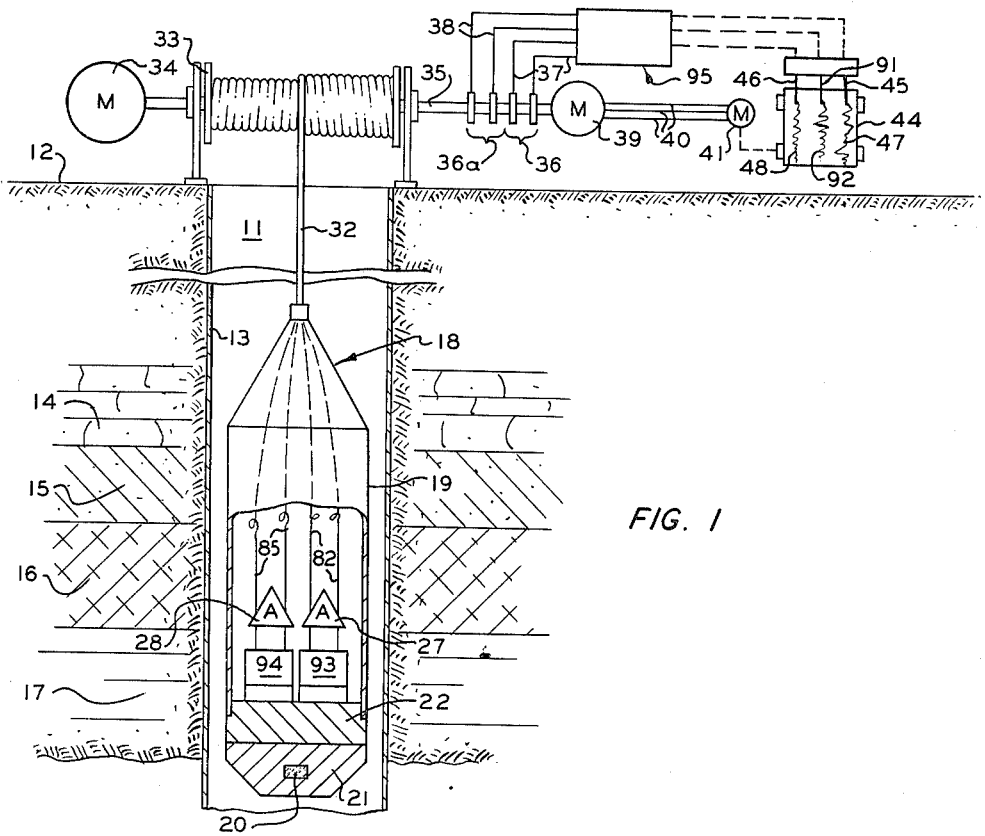

Oct. 12, 1965     J. D. OWEN     3,211,909
HYDROGEN INDEX AND GAMMA RAY WELL LOGGING
Filed Jan. 9, 1961

INVENTOR.
J.D. OWEN
BY Hudson & Young
ATTORNEYS

United States Patent Office 3,211,909
Patented Oct. 12, 1965

3,211,909
HYDROGEN INDEX AND GAMMA RAY
WELL LOGGING
Joe D. Owen, Bartlesville, Okla., assignor to Phillips
Petroleum Company, a corporation of Delaware
Filed Jan. 9, 1961, Ser. No. 81,363
7 Claims. (Cl. 250—83.3)

This invention relates to apparatus and a method for making a gamma ray log of downhole earth formations. In one aspect it relates to apparatus and a method for making downhole earth formation logs in conjunction with hydrogen index or porosity logs. In another aspect it relates to a method and apparatus for downhole well logging for indication of the presence of liquid hydrocarbon in siliceous and in carbonate formations.

There has been a great deal of interest and activity in the nuclear logging field concerning logging tool or tools that will record either gamma rays of certain energies or complete gamma ray spectra. These tools, in general, operate on substantially the same principle. They have a neutron source, a neutron detector which is sensitive to either thermal or epithermal neutrons, and a gamma ray detector. The neutron detector is used to give a log which is a function of the hydrogen atom density of the rock thereby indicating the presence of porosity filled with oil, water, or oil and water. The neutron detector does not give a log which is a function of the hydrogen atom density of the rocks suitable for use in prospecting for oil when the porosity of the rocks is filled with gas. The gamma ray detectors used are frequently NaI-photomultiplier assemblies which give electrical pulses, the height of which are proportional to the gamma ray energy detected. Analysis of these electrical impulses are significant in interpreting the source rock type.

Gamma ray energy is related to the type of nucleus from which the gamma ray originates. Many atoms are known to capture thermal neutrons with the emission of gamma rays of definite energies. At present, many gamma ray logging tools in the field are operated on the principle that if both hydrogen and chlorine are present, the likelihood of oil being present is low. Since chlorine is primarily contained in rock as NaCl dissolved in water, the presence of chlorine in the rock would indicate the presence of salt water or brine in the liquid containing formations. Usually when salt water is present hydrocarbon oil is not present.

If the porosity of a formation is filled with hydrogen, with the chlorine being low, the odds are good that liquid hydrocarbons are present. The low content of chlorine is believed to indicate the low content of salt water in the porosity of the rocks and with hydrogen being present, then the hydrogen is believed to be present in the form of liquid hydrocarbon.

These prior art logging methods are believed not to provide substantial information relative to the type of formation being logged. That is, hydrogen logs and chlorine logs can be produced from a well without definite indication as to whether the formation being logged is a siliceous formation or carbonate formation.

An object of this invention is to provide an apparatus and method for downhole well logging for indication of the presence of liquid hydrocarbons. Another object of this invention is to provide a method and apparatus for downhole well logging for indication of the presence of liquid hydrocarbons in siliceous and in carbonate formations. Still another object of this invention is to provide a method and apparatus for logging subterranean siliceous or sandstone and carbonate formations for the presence of hydrocarbon oils and separately recording the identity of these types of formations and their possibility of containing liquid hydrocarbon. Still other objects and advantages will be realized upon reading the following description which, taken with the attached drawing, forms a part of this specification.

Figure 2:
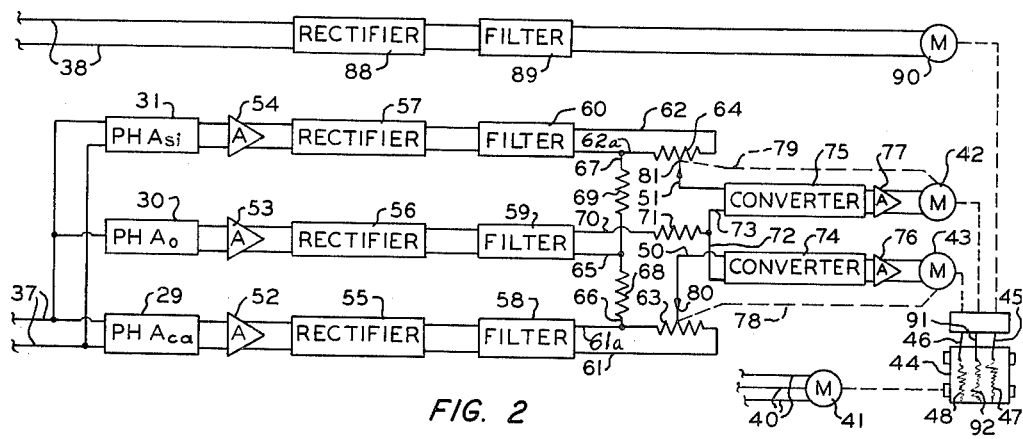

In the drawing, FIGURE 1 illustrates, in diagrammatic form, an arrangement of apparatus of this invention for logging subterranean formations. FIGURE 2 illustrates diagrammatically and in detail a portion of the apparatus illustrated in FIGURE 1.

In a sandstone formation, the silicon to oxygen ratio should be constant for any porosity if the pore space or voids are filled with liquid hydrocarbons. The silicon to oxygen ratio becomes lower when oxygen is present in addition to that contained in the silica. In case water is present in a sandstone formation the ratio of silicon to oxygen is lower than in the absence of water. When a log is made of silicon to oxygen ratio, any significant reduction in the value of this ratio, away from the condition of zero porosity would indicate that the porosity contains water. To add to the significance of such a ratio a conventional hydrogen index (porosity) log should be run simultaneously with the silicon-oxygen ratio log. The hydrogen, or porosity log, would indicate, as is well known art, the presence of hydrogen and therefore the presence of porosity. When these curves, that is, the hydrogen or porosity curve and a curve representating the silicon to oxygen ratio are presented as two strip chart recordings as a function of depth, a decrease in the silicon-oxygen ratio in a porous interval would be indicative of the presence of water. If a porous interval shows no decrease in the silicon-oxygen ratio, with the hydrogen curve indicating the presence of hydrogen, then the conclusion is that the pore spaces are filled with hydrocarbon.

The same reasoning as that explained relative to the sandstone is similarly applied to a carbonate formation, such as a limestone formation, or a dolomite formation. When applied to a limestone formation, the calcium-oxygen ratio should be constant for all porosities unless porosity is filled with water. Similarly in dolomite formations the calcium to oxygen ratio is also constant, but less than the ratio of calcium to oxygen in limestone formation, unless the pore space in the dolomite is filled with water. When logging such carbonate formation the hydrogen or porosity log is also run along with the calcium-oxygen log.

Briefly, the invention involves provision of a source of neutrons, preferably an accelerator producing 14 mev. (Million electron volts) neutrons, is provided, although polonium-beryllium or plutonium-beryllium sources are satisfactory. A NaI(Tl) crystal-photomultiplier assembly serves as a gamma ray detector. The output of this photomultiplier is then fed to a linear amplifier and the amplified signal is passed on to three separate pulse height analyzers, preferably of the differential window type. These analyzers are adjusted to the 1.78 mev. silicon peak, the 3.35 mev. calcium peak and the 6 mev. oxygen peak, respectively. The outputs of these pulse height analyzers are taken to electrical analog divider circuitry, with the resulting outputs being proportional to silicon-oxygen and to calcium-oxygen ratios. These signals are then fed to recording equipment and recorded, and interpreted as described herein above.

The hydrogen curve is obtained by the use of a LiI crystal, which serves as a fast neutron detector, in a conventional manner for neutron logging. The signal from this detector is then amplified and a signal related to the amplified signal is recorded alongside of the calcium-oxygen and silicon-oxygen ratio curves.

As disclosed herein a gamma ray spectra log and a hydrogen index (porosity) curve are used to determine the silicon-oxygen and calcium-oxygen ratios to indicate the presence of oil or water in a formation. A single sodium iodide detector for gamma rays feeds signals to separate pulse-analyzers which separate the signals into peaks representing silicon, calcium and oxygen. These three separate signals are then fed to a computer which computes a silicon-oxygen ratio and a calcium-oxygen ratio which are then recorded. A conventional hydrogen index, that is a porosity log, is also recorded. A significant decrease in the silicon-oxygen ratio or in the calcium-oxygen ratio indicates the presence of water, while the recorded trace on the chart remaining constant indicates the presence of hydrocarbon when the hydrogen log indicates the presence of hydrogen.

Referring to the drawing and specifically to FIGURE 1, reference numeral 11 identifies the borehole extending below the earth surface 12 into the earth. This borehole is provided with a casing 13. The borehole and casing penetrate formations 14, 15, 16 and 17. Reference numeral 18 identifies the downhole logging portion of the apparatus of this invention. This downhole device includes a tubular case 19 having its ends closed. In the lower portion of case 19 is provided a source 20 of fast neutrons supported within a body of aluminum 21 above which is a shield of lead or tungsten 22. This neutron source 20 is preferably a radium-beryllium capsule but can, if desired, be a polonium-beryllium or a plutonium-beryllium capsule. Immediately above shield 22 is provided a pair of crystal photomultiplier assemblies 93 and 94. The crystal photomultiplier assembly 93 is intended for detecting gamma rays from the irradiated formations and this detector assembly is preferably a sodium iodide, thallium activated, crystal photomultiplier. A suitable NaI(Tl) gamma ray crystal photomultiplier assembly is described on page 54 of Catalog A-4 of the Baird Atomic, Inc., Cambridge, Mass.

The output of this photomultiplier assembly 93 is fed to a linear amplifier 27 for voltage amplification. A suitable amplifier for this purpose is described in said catalog on page 40. The amplified signal is transmitted from amplifier 27 by way of leads 82 through cable 32 to the surface of the earth and the signal is taken from leads 82 by way of shaft 35 and slip rings 36 through leads 37 to the analog circuitry in assembly 95.

The crystal photomultiplier assembly 94 is a portion of the hydrogen logging part of this invention and includes a lithium iodide crystal, which is a fast neutron detector. A suitable lithium iodide detector and photomultiplier assembly is described in the Harshaw Chemical Company Scintillation Phosphors Catalog, page 39, The Harshaw Chemical Co., Cleveland, Ohio. The signal from this neutron photomultiplier assembly 94 is fed to a linear amplifier 28 similar to amplifier 27 and the signal therefrom is passed through leads 85 to the surface level by way of cable 32 and is then passed through shaft 35 and is taken therefrom by slip rings 36a and passed by way of leads 38 to assembly 95.

Referring to FIGURE 2 the signal, or signals, from the photomultiplier assembly 93 are fed by way of leads 37 to the separate pulse height analyzers of the differential window type 29, 30 and 31. Suitable pulse height analyzers are described on page 49 of the above-mentioned catalog of Baird Atomic, Inc. As illustrated in FIGURE 2, the pulse height analyzer 29 is set for the 3.35 mev. calcium peak, analyzer 30 is set for the 6 mev. oxygen peak while analyzer 31 is set for the 1.78 mev. silicon peak. Peak signals from the analyzers 29, 30 and 31 are amplified respectively in amplifiers 52, 53 and 54. These amplified A.C. signals are rectified respectively in rectifiers 55, 56 and 57 and the signals therefrom are filtered respectively in filters 58, 59 and 60. Suitable amplifiers, rectifiers and filters for use herein are obtainable from many instrument supply houses and their operation is well understood by those skilled in the art.

A first output terminal of filter 59 is connected to one input terminal of a converter 75 by leads 70 and 73 and to one input terminal of another converter 74 by a lead 72 branching from the point of juncture of leads 70 and 73. A second output terminal of filter 59 is connected by leads 65 and 67 to a lead 62a which connects one output terminal of filter 60 and one connection of a potentiometer 64. The second output terminal of filter 59 is also connected by a lead 66 extending from lead 65 to a lead 61a which connects one output terminal of filter 58 with one terminal of a potentiometer 63. Leads 66, 67 and 70 are provided with suitable isolating resistances 68, 69 and 71, respectively. A lead 62 connects a second output terminal of filter 60 with the other terminal of potentiometer 64 while a lead 61 connects a second output terminal of filter 58 with the other terminal of potentiometer 63. The signals from the respective pulse height analyzers are thus amplified, rectified and filtered. The magnitude of the voltage passing through conduit 65 is applied in opposition to the voltage between the second output terminal of filter 60 and a contactor 81 of potentiometer 64. If these two voltages are equal, there is no current flow by way of lead 51 to converter 75. If these two voltages are unequal, there is current flow through the input circuit of converter 75 and of polarity which is representative of the relative magnitudes and direction of the two voltages being compared. Converter 75 changes direct current flow in the input circuit thereof into a corresponding alternating current which is applied to the input terminals of an amplifier 77. The output terminals of the amplifier are connected to a reversible servo motor 42. The drive shaft of motor 42 is mechanically coupled with a linkage 79 to the contactor 81 of the potentiometer 64. The circuit, comprising converter 75, amplifier 77 and servo motor 42, is shown only schematically but it can be any suitable conventional circuit known in the art which converts a voltage difference into a corresponding motor rotation.

The magnitude of the voltage passing through conduit 63 is also applied in opposition to the voltage between the second output terminal of filter 58 and a contactor 80 of potentiometer 63. If these two voltages are equal, there is no current flow by way of lead 50 to converter 74. If these two voltages are unequal, there is current flow through the input circuit of converter 74 and of polarity which is representative of the relative magnitude and direction of the two voltages being compared. Converter 74 also changes direct current flow in the input circuit thereof into a corresponding alternating current which is applied to the input terminals of an amplifier 76. The output terminals of this amplifier are connected to a reversible motor 43. The drive shaft of motor 43 is mechanically coupled with a linkage 78 to the contactor 80 of the potentiometer 63. The circuit, comprising converter 74, amplifier 76 and servo motor 43, is also shown only schematically, but it can be any suitable conventional circuit known in the art which converts a voltage difference into a corresponding motor rotation. Motor 42 sends a signal to pen arm 91 for making a trace 92 related to the ratio of Si/O on chart 44. The motor 43 sends a signal to pen arm 46 for making a trace 48 related to the ratio of Ca/O on chart 44.

A suitable circuit for providing alternating current to the servo motor 42 and similarly to motor 43 is illustrated in Electronics Control Handbook, Batcher and Moulic, Caldwell-Clements, Incorporated, New York, 1946, page 298. Converters suitable for converting filtered signals from direct current to alternating current are illustrated in Catalog 15–10, pages 3–4, The Brown Instrument Company, Philadelphia, Pa.

The signal from the neutron detecting photomultiplier assembly 94 is amplified in amplifier 28 and the signal therefrom is passed by way of leads 85 to above ground with the signal being taken from shaft 35 by slip rings 36a and passed by way of leads 38 to the analog circuitry assembly 95. In assembly 95 the amplified signal from leads 38 is rectified in a rectifier 88, the signal therefrom is filtered in a filter 89 and the filtered signal is passed to a reversible motor 90. Motor 90 emits a signal to a pen arm 45 for actuation thereof for producing a trace 47 on chart 44. This trace 47 is a hydrogen log (porosity) trace.

The downhole logging device 18 is raised and lowered in borehole 11 on cable 32 which is wound on a reel 33 mounted on shaft 35 which in turn is rotated by a motor 34. On the end of shaft 35 opposite motor 34 is a generator 39 which produces a current for passage through leads 40 to a motor 41. Motor 41 rotates chart 44 in relation to the position of logging device 18 in the borehole.

Apparatus suitable for carrying out a division, for example, of a pulse related to the silicon content by a pulse related to the oxygen content of the formation being logged, is described and illustrated in Proceedings of the I.R.E., May 1947, pages 450–451.

In logging subterranean carbonate formations in many instances ordinary limestone formations are encountered and in other instances dolomitic formations are encountered. As is well known, limestone formations are substantially calcium carbonate while dolomitic formations are magnesium carbonate-calcium carbonate formations. The logging apparatus of this invention works equally well while logging dolomitic formations. The only difference in the operation when logging a dolomite is the ratio of the calcium to oxygen as observed from trace 92 is a smaller value that the trace produced when logging in a limestone formation. This decrease in the reading of the trace is occasioned by there being less calcium in a given quantity of dolomite than in the same quantity of limestone. However, the trace resulting from a limestone formation, as long as composition of the limestone remains constant, will be substantially a straight line. Also, when logging a dolomite with its composition remaining constant, the trace will be substantially a straight line but of a smaller value than the trace produced from the limestone.

In using the apparatus of this invention in actual logging operations, trace 92 representing the ratio of silicon to oxygen is read in conjunction with the hydrogen trace 47 when the logging apparatus is passing through a siliceous or sandstone formation while trace 48 is read in conjunction with the hydrogen log 47 when the logging apparatus is passing through a limestone or a dolomite formation.

As mentioned hereinabove a marked decrease in the ratio of silicon to oxygen accompanied by a showing of porosity as observed from the porosity trace 47 indicates the presence of additional oxygen in the formation which can result usually from the presence of water. Likewise a marked decrease in the ratio of the calcium to oxygen in a limestone formation or in a dolomite formation as observed from trace 92 when the hydrogen trace indicates the presence of hydrogen, suggests the presence of water in the porosity.

When trace 48 or trace 92 shows substantially no reduction in the respective calcium to oxygen or silicon to oxygen ratios along with the hydrogen log showing the presence of hydrogen then it is reasonable to believe that the porosity of the respective formation contains liquid hydrocarbon. As is well known in such logging art the presence of hydrogen whether it originates from water or from hydrocarbon shows up in the hydrogen log 47.

Power sources are not shown for use with this apparatus for purposes of brevity and simplicity. The need for such and their use are well understood by those skilled in the art.

While certain embodiments of the invention have been described for illustrative purposes, the invention obviously is not limited thereto.

I claim:

1. A method for logging an opening in the earth comprising providing a source of fast neutrons, passing said source of neutrons through said opening in the earth thereby irradiating earth formations surrounding said opening, detecting gamma rays from the irradiated formations and from the detecting step emitting a signal proportional to the detected gamma rays, analyzing this emitted signal for a pulse proportional to a silicon peak in terms of mev., from this analyzing step emitting a signal proportional to said silicon peak, further analyzing the emitted signal proportional to the detected gamma rays for a pulse proportional to an oxygen peak in terms of mev. and from this analyzing step emitting a signal proportional to said oxygen peak, dividing said signal proportional to said silicon peak by said signal proportional to said oxygen peak and from this dividing operation emitting a signal proportional to the quotient of the dividing operation, said quotient being an indication of the ratio of silicon to oxygen of the formations logged.

2. A method for logging an opening in the earth comprising providing a source of fast neutrons, passing said source of neutrons through said opening in the earth thereby irradiating earth formations surrounding said opening, detecting gamma rays from the irradiated formations and from the detecting step emitting a signal proportional to the detected gamma rays, analyzing this emitted signal for a pulse proportional to a calcium peak in terms of mev. and from this analyzing step emitting a signal proportional to said calcium peak, further analyzing the emitted signal proportional to the detected gamma rays for a pulse proportional to an oxygen peak in terms of mev., from this analyzing step emitting a signal proportional to said oxygen peak, dividing said signal proportional to said calcium peak by the signal proportional to said oxygen peak and from this dividing operation emitting a signal proportional to the quotient of the dividing operation, said quotient being an indication of the ratio of calcium to oxygen of the formation logged.

3. A method for logging an opening in the earth comprising providing a source of fast neutrons, passing said source of neutrons through an opening in the earth thereby irradiating earth formations surrounding said opening, detecting gamma rays from the irradiated formations and from the detecting step emitting a signal proportional to the detected gamma rays, analyzing this emitted signal for a pulse proportional to a silicon peak, for a pulse proportional to an oxygen peak and for a pulse proportional to a calcium peak, each in terms of mev., from these analyzing steps emitting signals proportional to said silicon peak, said oxygen peak and said calcium peak, respectively, dividing said signal proportional to said silicon peak by said signal proportional to said oxygen peak, dividing said signal proportional to said calcium peak also by said signal proportional to said oxygen peak, and from these dividing operations emitting signals proportional to the quotients of the dividing operations, said quotients being indications respectively of the ratio of silicon to oxygen and of calcium to oxygen of the formations logged.

4. In the method of claim 3, further detecting the thermal neutron flux emanating from the irradiated formations, said thermal neutron flux resulting from thermalizing of neutrons by hydrogen atoms of said formations, from this latter detecting operation emitting a signal proportional to the detected thermal neutron flux, and correlating said quotients with the emitted signal proportional to the detected thermal neutron flux; an increase in the latter mentioned signal in the absence of a decrease in the signal emitted by the operation of dividing said silicon peak by said oxygen peak being an indication of formation porosity containing hydrocarbon in a sandstone formation and an increase in the signal emitted from the thermal neutron detecting step in the absence of a decrease in the signal emitted by the operation of dividing said calcium peak by said oxygen peak being an indication of formation porosity containing hydrocarbon in a limestone formation.

5. An apparatus for geophysical prospecting comprising, in combination, a tubular member having its ends closed, said member being adapted to be lowered into an opening in the earth, a source of neutrons in said member, a thermal neutron detector and a gamma ray detector in said member, a shield between said source of neutrons and the detectors to eliminate direct passage of radiation to said detectors, said thermal neutron detector being adapted to emit a first signal related to the neutron flux detected, said gamma ray detector being adapted to detect gamma rays emitted by atoms bombarded by neutrons from said source and to emit signals related to gamma rays characteristic of neutron bombardment of silicon, oxygen and calcium atoms, first, second and third pulse height analyzers, each of said analyzers being in separate operative communication with said detectors, said first, second and third analyzers being adjusted to a 1.78 mev. (million electron volts) silicon peak, to a 6 mev. oxygen peak and to a 3.35 mev. calcium peak respectively, said analyzers being adapted to emit signals related to the respective peaks, first means for dividing a signal emitted from said first analyzer by a signal from said second analyzer communicating operatively with said first and second analyzers, second means for dividing a signal emitted from said third analyzer by the signal from said second analyzer, first and second indicating means in operative communication with the first and second dividing means respectively, said first and second indicating means being adapted to indicate a ratio of silicon to oxygen and calcium to oxygen respectively, and separate means communicating with said neutron detector for indicating porosity of the formation logged.

6. In the apparatus of claim 5, wherein said first and second indicating means are also recording means adapted for producing traces related to the ratio of Si to oxygen, to the ratio of Ca to oxygen, and still further means for recording a trace related to the porosity of the formation logged.

7. In the apparatus of claim 6, yet further means communicating operatively with said tubular member and with said first and second indicating and recording means and with said still further means for recording the porosity of the formation being logged for correlating the traces with depth of the formation being logged.

References Cited by the Examiner
UNITED STATES PATENTS

| | | | |
|---|---|---|---|
| Re. 24,383 | 10/57 | McKay | 250—71.5 |
| Re. 24,797 | 3/60 | Scherbatskoy | 250—71.5 |
| 2,862,106 | 11/58 | Scherbatskoy | 250—71.5 |
| 2,905,826 | 9/59 | Bonner et al. | 250—71.5 |
| 2,910,591 | 10/59 | Baker | 250—71.5 |
| 2,910,592 | 10/59 | Armistead | 250—71.5 |
| 2,971,094 | 2/61 | Tittle | 250—83.3 |
| 2,983,817 | 5/61 | Earley et al. | 250—83.3 |
| 2,991,364 | 7/61 | Goodman | 250—83.6 |
| 2,996,618 | 8/61 | Goodman et al. | 250—83.6 |
| 3,035,174 | 5/62 | Turner et al. | 250—71.5 |
| 3,061,725 | 10/62 | Green | 250—71.5 |

RALPH G. NILSON, *Primary Examiner.*

ARCHIE R. BORCHELT, *Examiner.*